(12) United States Patent
Côté

(10) Patent No.: US 6,863,823 B2
(45) Date of Patent: Mar. 8, 2005

(54) INVERTED AIR BOX AERATOR AND AERATION METHOD FOR IMMERSED MEMBRANE

(75) Inventor: Pierre Côté, Dundas (CA)

(73) Assignee: ZENON Environmental Inc., Oakville (CA)

( * ) Notice: Subject to any disclaimer, the term of this patent is extended or adjusted under 35 U.S.C. 154(b) by 188 days.

(21) Appl. No.: 10/171,997

(22) Filed: Jun. 17, 2002

(65) Prior Publication Data

US 2002/0153313 A1 Oct. 24, 2002

Related U.S. Application Data

(63) Continuation-in-part of application No. 10/061,108, filed on Feb. 1, 2002.
(60) Provisional application No. 60/278,007, filed on Mar. 23, 2001.

(51) Int. Cl.[7] .............................................. B01D 61/00
(52) U.S. Cl. ..................... 210/659; 210/636; 210/321.8; 210/257.2; 261/122.2; 261/124; 261/38.1; 261/DIG. 70
(58) Field of Search ................................. 210/650, 636, 210/257.2, 195.1; 261/122.2, 124, 36.1, DIG. 70

(56) References Cited

U.S. PATENT DOCUMENTS

| | | | |
|---|---|---|---|
| 2,995,497 A | | 8/1961 | Heden |
| 5,133,862 A | * | 7/1992 | Cannan et al. ......... 210/321.75 |
| 5,151,191 A | * | 9/1992 | Sunaoka et al. ............ 210/644 |
| 5,192,456 A | | 3/1993 | Ishida et al. |
| 5,482,625 A | | 1/1996 | Shimizu et al. |
| 5,639,373 A | | 6/1997 | Mahendran et al. |
| 5,716,519 A | * | 2/1998 | Schleife et al. ............. 210/206 |
| 5,910,250 A | | 6/1999 | Mahendran et al. |
| 5,944,997 A | * | 8/1999 | Pedersen et al. ............ 210/636 |
| 5,989,428 A | * | 11/1999 | Goronszy ................... 210/605 |
| 6,156,200 A | * | 12/2000 | Zha et al. .............. 210/321.89 |
| 6,199,835 B1 | * | 3/2001 | Chang et al. .................. 261/77 |
| 6,245,239 B1 | | 6/2001 | Cote et al. |
| 6,402,955 B2 | * | 6/2002 | Ookata ........................ 210/636 |
| 6,478,964 B1 | * | 11/2002 | Redmon ...................... 210/620 |
| 6,524,481 B2 | * | 2/2003 | Zha et al. .................... 210/636 |
| 6,620,319 B2 | * | 9/2003 | Behmann et al. ....... 210/321.69 |
| 6,641,733 B2 | * | 11/2003 | Zha et al. .................... 210/615 |

FOREIGN PATENT DOCUMENTS

WO     WO 00/21890     4/2000

\* cited by examiner

Primary Examiner—Ana M. Fortuna
(74) Attorney, Agent, or Firm—Bereskin & Parr

(57) ABSTRACT

An aerator for immersed filtering membranes has an aerator shell with openings for discharging bubbles from its upper surface and a shape capable of temporarily containing a volume of air in fluid communication with the openings. The shell is open to tank water below it and located so that discharged bubbles will rise through an assembly of the filtering membranes. The shell may be wholly or partially made of parts of the assemblies of filtering membranes. A supply of air is provided to the air space in the aerators alternating between a high flow rate and a low flow rate in short cycles of between about 10 seconds and 100 seconds. A filtration system has an inlet for adding substrate and an outlet for retentate are located so as to create a horizontal flow of substrate through the tank. Membrane assemblies are located within the horizontal flow of substrate. Aerators as described above are provided and operated as described above.

14 Claims, 3 Drawing Sheets

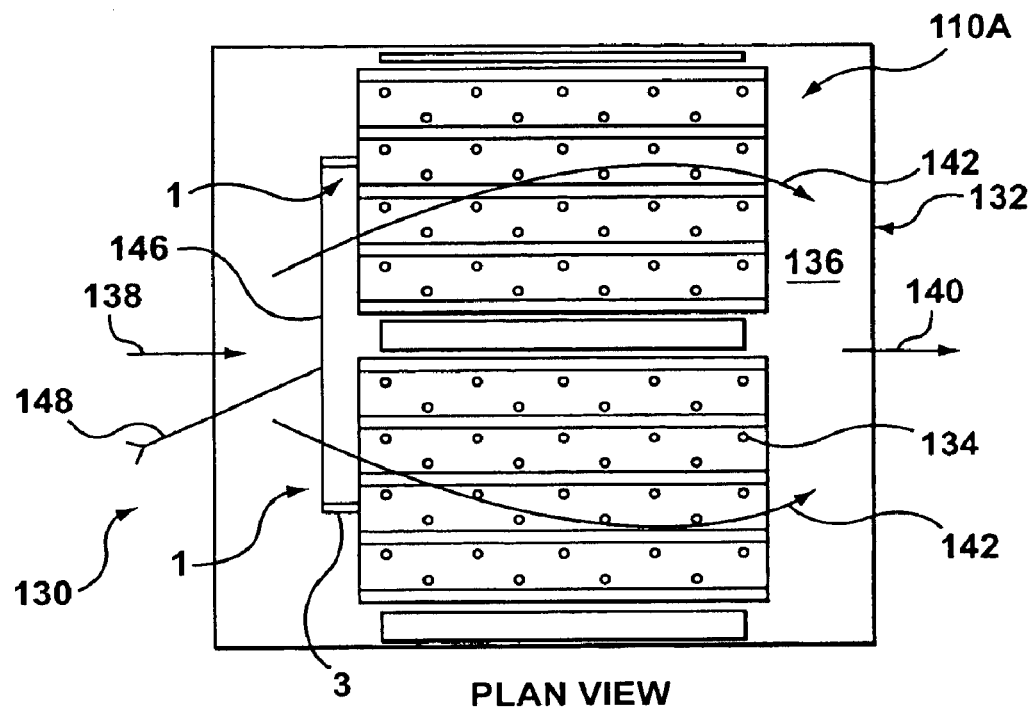
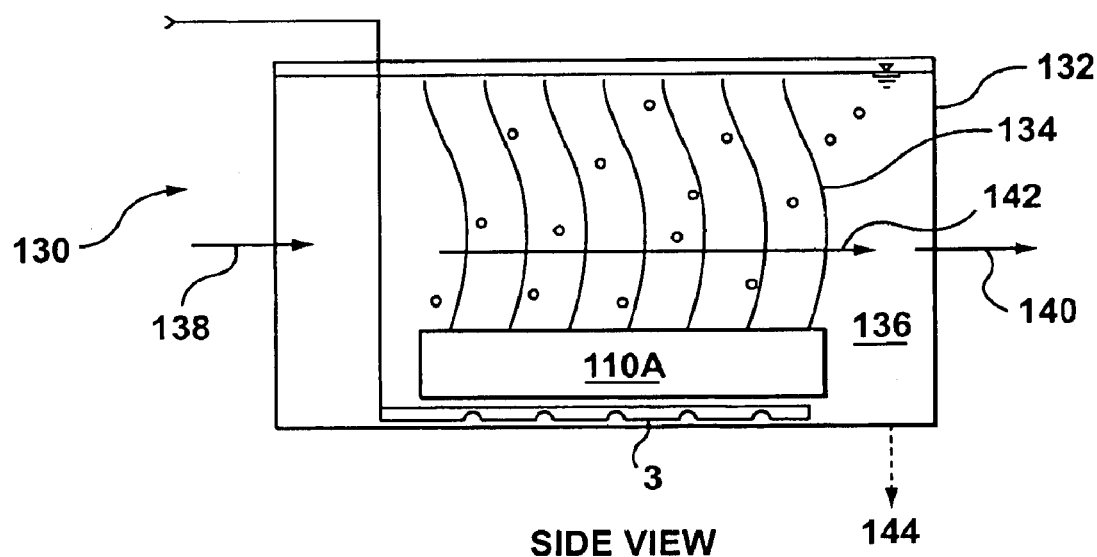
FIG. 4

US 6,863,823 B2

INVERTED AIR BOX AERATOR AND AERATION METHOD FOR IMMERSED MEMBRANE

This is a continuation in part of U.S. patent application Ser. No. 10/061,108, filed Feb. 1, 2002, which is a non-provisional of U.S. provisional application No. 60/278,007 filed Mar. 23, 2001. The entire content of U.S. Ser. No. 10/061,108 and U.S. Ser. No. 60/278,007 is incorporated herein by this reference to them.

FIELD OF THE INVENTION

This invention relates to an aerator, aerating method and filtration system for immersed membranes.

BACKGROUND OF THE INVENTION

Aeration is used with immersed membranes to scour the membranes and to disperse areas of tank water having increased concentrations of rejected solids from near the membranes. An ideal aeration system for immersed membranes would scour the entire assembly of membranes with minimum energy use, cost and maintenance required to keep the aerators from plugging.

U.S. Pat. Nos. 5,192,456 and 5,482,625, issued on Mar. 9, 1993 and Jan. 9, 1996 to Kubota Corporation, describe an air diffuser disposed below a set of membrane cartridges. A casing surrounds the air diffuser and the membrane cartridges, extending vertically from the bottom of the diffuser to the top of the membrane cartridges. In commercial embodiments, the diffuser is locater about 1 m below the membrane cartridges and the diffusers provide a small number of holes per square metre of horizontal cross-sectional area of the assembly of membrane cartridges. Air is supplied such that the air velocity and pressure in the holes of the diffusers is sufficient to prevent water or sludge from creeping into the holes of the diffuser. The casing and location of the diffuser below the membrane cartridges encourages the bubbles to become evenly dispersed by the time that they reach the membrane cartridges. The shroud and deep aerators increase both the equipment cost and the energy required to produce bubbles. The method also relies on the membrane cartridges being arranged in parallel vertical plates for full effectiveness.

Another approach is described in U.S. Pat. No. 5,944,997, issued on Aug. 31, 1999 to Zenon Environmental Inc. In this patent, aerators are located directly below a set of membrane modules and no shroud is used but there are many more holes—about 130–160 holes per square metre of horizontal cross-sectional of the assembly of membrane modules. Although the large number of holes provides well distributed bubbles, the air flow per hole is not sufficient to prevent tank water or sludge from creeping into the aerators around the perimeter of the holes. To prevent this tank water from leaving deposits in the aerator, the aerators are periodically flushed. Although effective, this method involves an extensive grid of aerators to provide the large number of holes and additional equipment for flushing the aerators.

SUMMARY OF THE INVENTION

It is an object of the invention to improve on the prior art. Other objects of the invention include providing an aerator and aeration process for immersed filtering membranes and providing a membrane filtration system. The objects of the invention are met by the combination of features, steps or both described in the claims. The following summary may not describe all necessary features of the invention which may reside in a sub-combination of the following features or in a combination of some or all of the following features and features described in other parts of this document.

Various aspects of the invention are directed at an aerator having an aerator shell with openings for discharging bubbles from its upper surface and a shape capable of at least temporarily containing a variable volume of air in fluid communication with the openings for discharging bubbles. The shell is open to tank water such that the tank water can act on the volume of contained air and so that substrate can be displaced from or enter into the aerator as the volume of trapped air changes. The aerator shell is located so that discharged bubbles will rise through an assembly of filtering membranes. The shell may be a separate structure, such as an inverted box, or may be wholly or partially made of parts, for example headers, of modules of the filtering membranes. The aerator shell is fed with air varying between a higher rate of air flow and a lower rate of air flow, which is one half or less of the higher flow rate, in short repeated cycles of between about 10 seconds and 100 seconds in duration, or between about 10 seconds and 60 seconds in duration. The lower rate of air flow may be an air off condition or be about 10% or less than the higher rate of air flow. Apparatus for providing such cycles are described in PCT Application PCT/CA99/00940, published as WO 00/21890. All of PCT/CA99/00490 is incorporated herein by this reference to it.

Air may be provided to the aerator shell at the higher flow rate during about ⅛ to ½ of each cycle. When air is provided at a higher rate of air flow, the aerator traps a pocket of air which grows in volume and releases bubbles from its upper surface. When air is provided at the lower rate of air flow, the aerator may continue to release bubbles from its upper surface and the volume of the air pocket decreases. Bubbles may be released during about ⅓ to ⅔ of the cycle duration. The aerator may become partially or completely flooded during a later part of the lower air flow period to help remove accumulated solids. Alternately, bubbles may be produced throughout each cycle.

In other aspects of the invention, a filtration system, which may be used to extract drinking water from a water to be filtered, has one or more immersed membranes assemblies, or modules, located in a tank open to the atmosphere with the membranes immersed in the substrate. An inlet for adding substrate and an outlet for retentate are located so as to create a horizontal flow of substrate through the tank. Some or all of the retentate may be, but preferably is not, circulated to the inlet and a second outlet or other means for removing settled solids may be provided. The membrane assemblies are located within the horizontal flow of substrate and may be spaced or oriented to encourage the horizontal flow to carry solids in the substrate to the outlet. Aerators as described above are provided and operated as described above. The aerators may be comprised of parts of the membrane assemblies or located closely below the membrane assemblies since the horizontal flow of substrate reduces or eliminates the need for the tank water to circulate around the membrane assemblies.

BRIEF DESCRIPTION OF THE DRAWINGS

For a better understanding of the present invention, and to show more clearly how it may be carried into effect, reference will now be made by way of example to one or more embodiments illustrated in the following drawings in which:

FIG. 4 is a schematic view of parts of a filtration system.

DETAILED DESCRIPTION OF THE INVENTION

Figure 1:
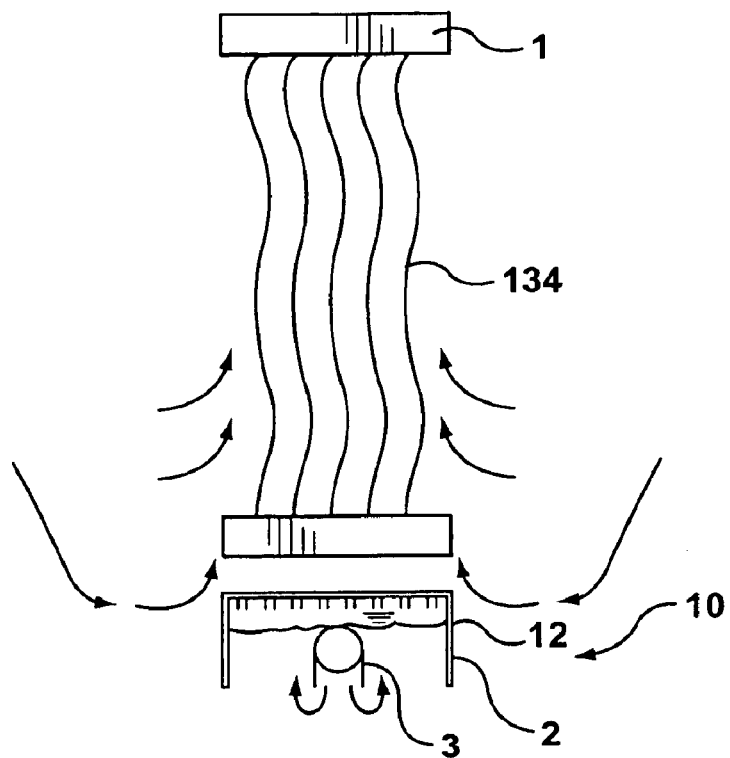
FIG. 1 is a schematic view of the side of a membrane assembly, and a first embodiment of an aerator.
Figure 2:
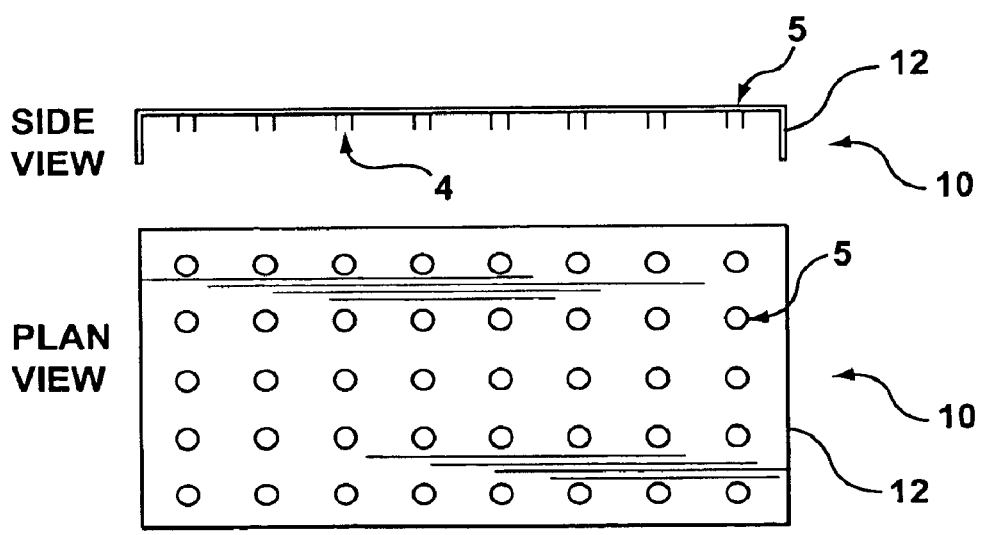
FIG. 2 is schematic top and side views of the aerator of FIG. 1.

FIGS. 1 and 2 show a first aerator 10 having an aerator shell 12 in the shape of an inverted box which will be called an air box 2. Referring to FIG. 1, the air box 2 is located below at least one membrane assembly 1. The first aerator 10 may also service a plurality of membrane assemblies 1, for example four to sixteen, or more, membrane assemblies 1. A space between the membrane assembly 1 and the air box 2 optionally promotes liquid recirculation through and about the membrane assembly 1. Alternately, the space may be reduced or eliminated to preserve space when the air box 2 is used with the filtration system described further below.

The air box 2 may be rectangular or other shapes capable of supporting holes 5 in desired locations in an upper surface, at least temporarily containing a variable volume of air in communication with the holes 5 and open to tank water so that tank water can be displaced from or enter into the air box 2 as the volume of contained air changes. The air box 2 may have horizontal dimensions to generally match the footprint of the membrane assembly 1 above it. The height of the side walls of the air box 2 are such that the air box 2 can contain a volume of air corresponding to the amount of air which is provided from an air distribution pipe 3 less the volume of air produced as bubbles through the holes 5, and nipples 4 if used, as will be described further below.

The air distribution pipe 3 is located as close as possible to the air box 2 to limit the height of the water column (or pressure) which must be overcome to eject air and thereby minimize energy required. The air distribution pipe may be located such that it discharges air directly inside the air box 2.

The air box 2 may be attached to the membrane assembly 1 which facilitates inspection when the membrane assembly is pulled out. Alternately, the air box 2 may be attached to the air distribution pipe 3 or attached to its own mounting apparatus.

The air distribution pipe 3 has at least one large aeration hole located under each air box 2. The size of the aeration holes in the air distribution pipe 3 may be chosen to minimize fouling, for example, very large holes may foul less rapidly. The air distribution pipe 3 may simultaneously supply air to several air boxes 2.

Referring to FIG. 2, the air box 2 upper surface has a series of air holes 5 arranged in a regular pattern. The hole size is such that the holes 5 do not plug from debris in water and produce bubbles of an appropriate diameter for scouring the membrane assembly 1, typically 5–15 mm. The density of holes 5 depends on design of the membrane assembly 1 and aeration requirements and may be 25 to 160 holes per square metre. The holes may be fitted with nipples 4 pointing downward to provide a residual air cushion in the air box 2 which promotes the rapid horizontal dispersion of air.

In operation, the rate of air flow in the air distribution pipe 3 varies in a repeated cycle having a total cycle length or duration of between about 10 and 100 seconds. In general, there is a period at a higher flow rate and a period at a lower flow rate. The lower flow rate is one half or less of the higher flow rate.

The lower flow rate may be 10% or less than the higher flow rate or the lower flow rate may an air off condition or have substantially no air flow. The period of higher flow may be between about ⅛ and ½ of the total cycle duration. Most often, the period of higher flow and period of lower flow are each about ½ of the cycle duration. The change between the higher flow rate and the lower flow rate is performed rapidly, i.e. in less than about 6 seconds or in less than about 3 seconds.

During the higher flow period, the air box 2 fills with air because the air flow from the air distribution pipe 3 is larger than the air flow from the air box 2 as bubbles which flow upwards to the membrane assembly 1.

The air box continues to discharge air bubbles through the holes 5 to scour the membrane assembly 1 during the lower flow period. The air box 2 may be sized in relation to the number and size of holes 5 and the flow rate and duration of air flow from the air distribution pipe 3 such that air flows through the holes 5 throughout each cycle. Alternately, the air box 2 may be sized to become empty of air during a part of the lower flow period which allows tank water to flow thorough the holes 5 or nipples 4 to wash away deposits left around the holes 5 or nipples 4.

Air cycling, meaning a flow of air that varies in rate as described above, may be provided to multiple, distinct groups of membrane assemblies 1 connected to 2 or more air distribution pipes 3 from a single air blower operated at a single rate. This is done by providing a plurality of air distribution pipes 3 which form or communicate with a plurality of distinct branches of an air distribution system. A valve set communicates between an air supply and the distinct branches. The valve set is operated to split an initial air flow from the air supply such that at any time at least one distinct branch receives air at a higher flow rate and at least one other of the branches receives air at a lower rate. The valve set switches which distinct branch or branches receives air at the higher flow rate and the lower flow rate in repeated cycles. This is described more fully in WO 00/21890 which is incorporated herein in its entirety by this reference.

Because of the volume of air temporarily contained in the air box 2 during the high flow period, bubbles are produced for a greater portion of the cycle than the higher flow period. For example, if two distinct branches are provided, the higher flow period in each will be about ½ of the cycle duration but bubbles may be produced for between about ½ and ¾ of the cycle duration. Alternately, 4 distinct branches might be fitted to a single blower and each receive air at the higher flow rate for about ¼ of the cycle duration. Yet, because of the volume of air temporarily trapped in the air box 2, bubbles can be produced for about ⅓ to ½ of the cycle duration.

Benefits of the first embodiment include:

1. Avoid an aerator grid which requires a larger network of pipes.

2. Reduce the need to flush aerators with permeate to wash away deposits left by tank water entering the aerator as described in U.S. Pat. No. 5,944,997 issued on Aug. 31, 1999 to Pedersen et al.

3. Facilitates scale-up to aeration of a large set of membrane assemblies 1.

4. Decreases maintenance requirements since the air box 2 is easily cleaned and is generally self cleaning when permitted to flood periodically.

Figure 3:
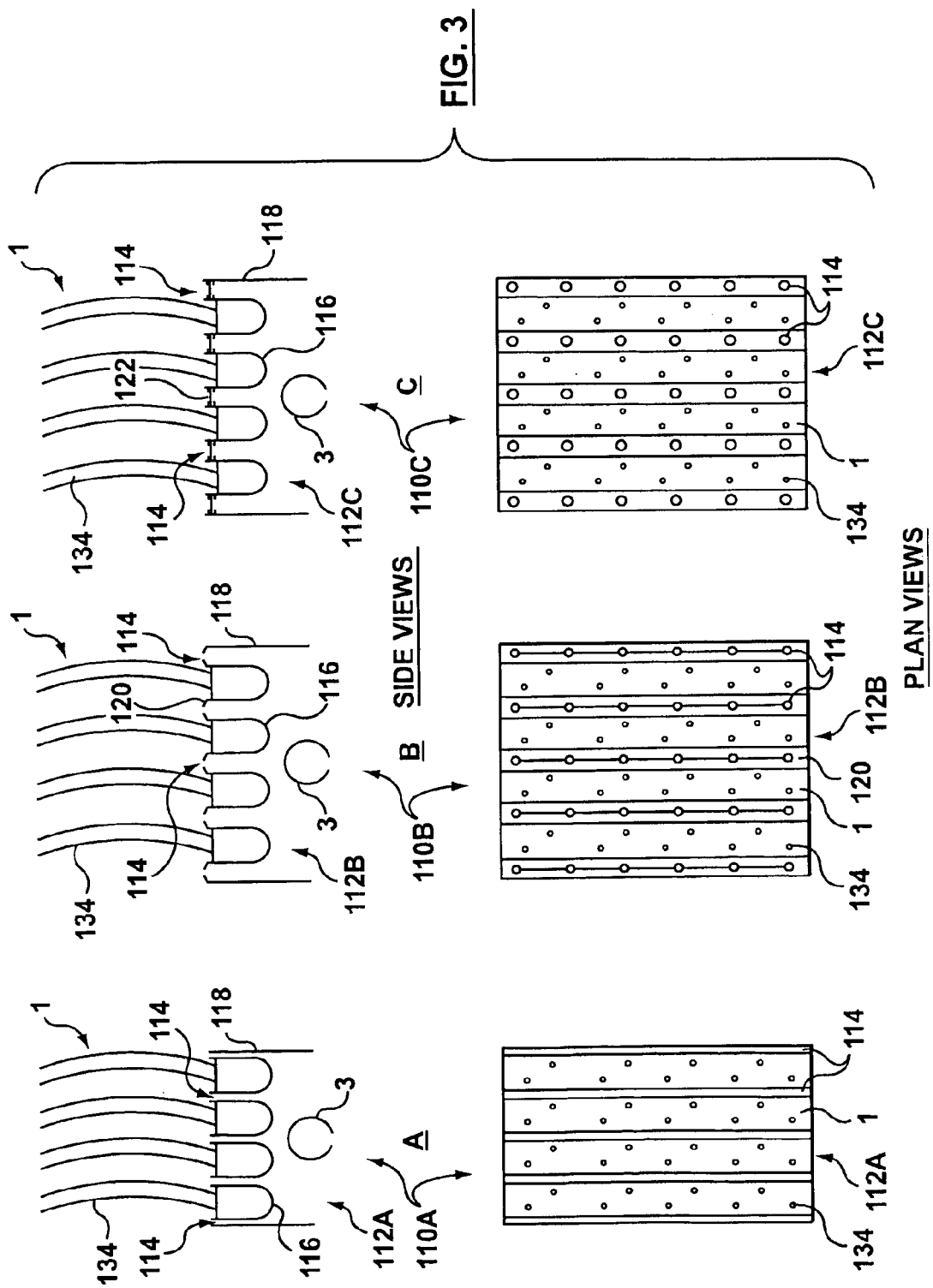
FIG. 3 is a schematic view of side and plan views of other embodiments of aerators partially or wholly made up of parts of membrane assemblies.

Three further embodiments, A, B and C, are shown in FIG. 3. These embodiments are like the first embodiment in many ways and the description of the first embodiment generally applies to them except for the differences noted below.

FIG. 3 shows second aerators 110A, 110B and 110C. Each has a second aerator shell 112A,B,C with openings 114 for discharging bubbles from their upper surfaces. The shape of the second aerator shells 112A,B,C allows them to at least temporarily contain a variable volume of air in fluid communication with the openings 114. The second aerator shells 112A,B,C are also downwardly open to allow tank water or substrate to act against any contained air. The openings 114 are located so that discharged bubbles will rise through a membrane assembly 1. Parts of the membrane assemblies 1, for example headers 116, form part of the second aerator shells 112A,B,C. Four membrane assemblies 1 are shown, but the second aerator shells 112A,B,C may be used with more membrane assemblies, ie. between four and sixteen, or more, membrane assemblies 1. Side walls 118 of the second aerator shells 112A,B,C may also be made as parts of the membrane assemblies 1. Flanges 120 on the headers 116 are also part of the second aerator shell 112B. Hole forming strips 122 between the headers 116 are part of the third aerator shell 112C. The hole forming strips may be made as part of the membrane assemblies 122. Air distribution pipes 3 are provided below the second aerators 110 as described above.

FIG. 4 shows a filtration system 130 having membrane assemblies 1 located in a tank 132 which is open to the atmosphere to immerse membranes 134 in a substrate 136. An inlet 138 for adding substrate 136 and an outlet 140 for retentate are located so as to create a horizontal flow of substrate 142 through the tank 132. Some or all of the retentate may be, but preferably is not, circulated to the inlet 138 and a second outlet 144 or other means for removing settled solids may be provided. The membrane assemblies 1 are located within the horizontal flow of substrate 142 and may be spaced or oriented to encourage the horizontal flow of substrate 142 to carry solids in the substrate to the outlet 140. For example, elongated membrane assemblies 1 may be oriented generally parallel with the horizontal flow of substrate 142. Second aerators 110A are shown although first aerators 10 or second aerators 110B,C may also be used. The aerators 10,110 are operated as described above. If first aerators 10 are used, they may be located closely below the membrane assemblies 1 since the horizontal flow of substrate 142 reduces or eliminates the need for substrate 136 to circulate around the membrane assemblies 1. Air is supplied to the aerators 10, 110 through air distribution pipes 3 connected to branches 146 of a cyclic aeration system 148.

Other embodiments of the invention may be made in alternate configurations and operated according to alternate methods within the scope of the invention which is defined by the following claims:

I claim:

1. An aerator for filtering membranes immersed in a tank of liquid, comprising:
   a) an upper surface having holes for discharging bubbles below the membranes;
   b) sides extending downwardly from the upper surface which surround a space for trapping a variable volume of air in communication with the holes; and
   c) an opening between the space and the liquid in the tank so that liquid can be displaced from or enter into the aerator as the volume of trapped air changes,
   wherein the holes have nipples extending downwards from the upper surface so as to preserve a volume of trapped air even when no air is supplied to the aerator.

2. An aeration system comprising an aerator of claim 1 and an air supply system for introducing air to the space at rates varying between a higher flow rate and a lower flow rate in short cycles of less than about 100 seconds.

3. A method of aerating immersed filtering membranes comprising the steps of:
   a) providing an aeration system as described in claim 2; and,
   b) operating the air supply system to provide a supply of air alternating between a higher flow rate and a lower flow rate in short cycles of between about 10 seconds and 100 seconds in duration.

4. The process of claim 3 wherein the rate of air flow during the period of low flow is 10% or less of the rate of air flow during the period of high flow.

5. The process of claim 4 wherein there is substantially no air flow during the period of low air flow.

6. The process of any of claim 3 wherein the period of high flow is between about ⅛ and ½ of the total cycle duration.

7. The process of any of claim 3 wherein the change between the high flow rate and low flow rate is performed in less than about 6 seconds.

8. The process of claim 7 wherein the change between the high flow rate and low flow rate is performed in less than about 3 seconds.

9. The process of any of claim 3 wherein the aerator is sized in relation to the duration and rate of air flow provided during a cycle such that air flows through the holes throughout each cycle.

10. The process of any of claim 3 wherein the aerator is sized in relation to the duration and rate of air flow provided during a cycle such that no air flows through the holes during at least part of the cycle such that liquid in the tank may flow into the holes.

11. The process of claim 10 wherein air flows through the holes of the aerator for between about ⅓ and ¾ of the cycle duration.

12. The process of claim 11 wherein air flows through the holes for about ½ of the cycle duration.

13. A filtration apparatus comprising:
   (a) a tank open to the atmosphere for holding a substrate to be filtered;
   (b) assemblies of membranes immersed in the substrate;
   (c) aeration systems according to claim 6 located to supply bubbles to the assemblies of membranes;
   (d) an inlet for adding substrate to the tank; and,
   (e) an outlet for retentate to flow form the tank,
   wherein the inlet and outlet are located so as to create a horizontal flow of substrate through the tank and the membrane assemblies are located within the horizontal flow of substrate.

14. The apparatus of claim 13 wherein the assemblies of membranes are spaced or oriented to encourage the horizontal flow to carry solids in the substrate to the outlet.

* * * * *